(No Model.)

M. P. WILKINS.
LOCK WASHER.

No. 456,296. Patented July 21, 1891.

Witnesses:-
D. H. Haywood
C. E. Sundgren

Inventor:-
Monroe P. Wilkins
by attorneys
Brown & Seward

UNITED STATES PATENT OFFICE.

MONROE P. WILKINS, OF NEW YORK, N. Y.

LOCK-WASHER.

SPECIFICATION forming part of Letters Patent No. 456,296, dated July 21, 1891.

Application filed January 12, 1891. Serial No. 377,407. (No model.)

*To all whom it may concern:*

Be it known that I, MONROE P. WILKINS, of the city and county of New York, in the State of New York, have invented a new and useful Improvement in Lock-Washers, of which the following is a specification.

My invention relates to an improvement in lock-washers for use in connection with a bolt or nut for the purpose of preventing the unintentional loosening of the nut.

A practical embodiment of my invention is represented in the accompanying drawings, in which—

Figure 1:
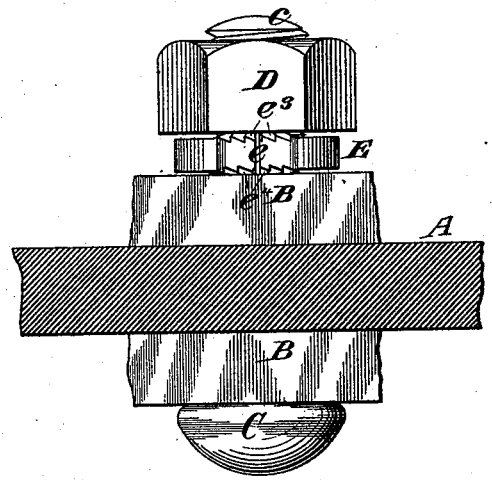
Figure 2:
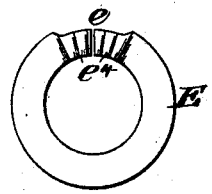
Figure 3:
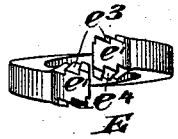
Figure 4:
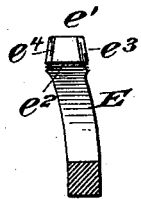

Figure 1 represents the washer in position on a bolt and engaged with the nut and plate as in use. Fig. 2 is a view of the washer in side elevation. Fig. 3 is a view of the same in edge elevation; and Fig. 4 represents a vertical section of the washer, taken transversely thereof through the opening between the ends.

The lock-washer is represented in the present instance in connection with a bolt for securing the fish-plates of a railway-joint, a use to which it is well adapted. Its use is not, however, limited to this particular purpose; but it is well adapted to general use wherever it is required to lock a nut upon a bolt.

A represents the web of a rail, and B represents the portions of the fish-plates through which the retaining-bolt C extends. The nut is represented by D, and the screw-threaded end of the bolt with which the nut engages is denoted by c.

E represents the body of the washer, preferably formed, as herein shown, as an annular ring, split, as at e, and substantially rectangular in cross-section, excepting at the end portions. For a short distance back from the ends the said washer is spread laterally beyond the plane of the face of the washer, preferably, but not necessarily, of slightly tapered form in cross-section, being narrow at its outer surface $e'$ and wider at its inner surface $e^2$. The opposite sides of the said spread end portions are provided with teeth $e^3$ and $e^4$, preferably of the ratchet type, those upon one side of the washer facing in one direction and those on the opposite side of the washer facing in the opposite direction. The number of teeth which I find it desirable to form is three, upon the opposite sides of each end, as this effectually prevents any liability of the strain becoming sufficiently great upon any one of the teeth to break or turn it. The number of course might be greater or less than three, as circumstances might require.

The washer, when tempered and free to assume its normal shape, has a winding form, as clearly shown in Fig. 3, and when its spread portions are forced by the nut into engagement with the plate its tendency to resume its winding form will tend to hold the teeth upon the opposite sides of the two ends in close contact with the face of the nut and the face of the plate, respectively. The opposite sides of the spread ends of the washer will when the nut is forced into contact therewith embed themselves in the faces of the nut and plate, respectively. By this means the nut becomes securely locked to the plate, and any jar tending to loosen the nut will have the effect, because of the spring-tension due to the wind in the washer, of embedding the teeth more firmly in the faces of the nut and plate.

In manufacturing the washer a strip of material of suitable length, rectangular in cross-section, having been formed, the ends may be shaped into the taper form described and the teeth formed thereon by compressing the metal at the ends within suitable dies. In so doing a portion of the metal which forms the outer part of the strip in proximity to the ends is disposed in the form of teeth and the broader part of the inner portion. This structure admits of a material saving in the cost of manufacture, as I am enabled to use stock of ordinary form and save the cost of special rolling.

While I have shown the teeth located at the end portions only, it is obvious that other portions of the ring than the ends might be thrown out of the plane of the side of the ring in toothed form.

What I claim is—

1. The lock-washer consisting of a split ring having a normally winding form and having its end portions spread laterally beyond the remaining body portion of the ring, the said spread portions being extended a considerable distance from the ends and provided on their opposite sides with a series of ratchet-teeth, substantially as set forth.

2. The lock-washer consisting of a split ring, the ends of the washer in proximity to the point where the ring is split being spread laterally beyond the remaining body portion of the ring, the said spread portions being extended a considerable distance from the ends and provided with sides oblique with respect to the faces of the remaining body portion of the washer, said slanting sides being provided with a series of ratchet-teeth, substantially as set forth.

MONROE P. WILKINS.

Witnesses:
FREDK. HAYNES,
K. E. PEMBLETON.